(12) United States Patent
Fuller

(10) Patent No.: US 6,416,834 B1
(45) Date of Patent: Jul. 9, 2002

(54) COMPOSITION FOR IMPROVING ADHESION OF ELASTOMERS TO POLYMER COMPOSITIONS

(75) Inventor: Robert Earl Fuller, Hudson, OH (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/525,240

(22) Filed: Mar. 15, 2000

Related U.S. Application Data

(62) Division of application No. 08/685,280, filed on Jul. 23, 1996, now Pat. No. 6,057,014.
(60) Provisional application No. 60/001,445, filed on Jul. 26, 1995.

(51) Int. Cl.[7] .............................................. B29D 22/00
(52) U.S. Cl. .................... 428/35.7; 428/34.1; 428/34.3; 428/36.3; 428/36.8; 428/36.9; 428/36.91; 428/421; 428/422; 525/74; 525/78; 525/207; 525/221; 525/285; 525/327.6; 525/327.4; 525/340; 525/374

(58) Field of Search ................................. 428/34.1, 34.3, 428/35.7, 36.3, 36.8, 36.9, 36.91, 421, 422; 525/74, 78, 207, 221, 285, 327.6, 327.4, 340, 374

(56) References Cited

U.S. PATENT DOCUMENTS 3,853,815 A * 12/1974 Lubowitz .................. 260/63 R
5,300,569 A * 4/1994 Drake et al. .................. 525/78

* cited by examiner

*Primary Examiner*—Judy M. Reddick

(57) ABSTRACT

Adhesion promoting compositions comprising mixtures of carboxylated unsaturated polymers and a) amines; b) amine derivatives; or c) mixtures of hydroxy compounds and quaternary phosphonium salt accelerators or quaternary ammonium salt accelerators are useful as components of curable elastomer compositions. The curable compositions exhibit excellent adhesion to fluoropolymers.

29 Claims, No Drawings

US 6,416,834 B1

COMPOSITION FOR IMPROVING ADHESION OF ELASTOMERS TO POLYMER COMPOSITIONS

This is a division of application Ser. No. 08/685,280 filed Jul. 23, 1996, now U.S. Pat. No. 6,057,014, which claims the benefit of U.S. Provisional Application No. 60/001,445 filed Jul. 26. 1995.

BACKGROUND OF THE INVENTION

This invention relates to an adhesion-promoting additive for use in elastomers. In addition, this invention relates to elastomer compositions having enhanced adhesion to other polymers, in particular, to fluoropolymers.

Laminates of elastomers and fluoropolymers are desirable for use in a wide variety of commercial products, for example, in fuel hoses, pump diaphragms, and wire coatings. Good interlayer adhesion is required in such applications in order to produce constructions with acceptable service life. Further, it is desirable that such adhesion be achieved during the laminate curing process, without the necessity of applying primers or adhesives to the uncured elastomer surface.

One method described in the art for promoting interlayer adhesion between dissimilar elastomers and between elastomers and thermoplastic compositions is described in U.S. Pat. No. 5,300,569 and involves addition of polymeric adducts of dicarboxylic acids or dicarboxylic acid derivatives to uncured elastomers to promote adhesion to various substrates. While such systems often provide improvement in adhesion, certain demanding commercial requirements require even greater bond strengths than can be achieved through use of the adducts alone. In addition, the systems disclosed in U.S. Pat. No. 5,300,569 are not suitable for use with certain elastomers, including those mixed with amines or active hydrogen compounds.

The present invention is directed to elastomer compositions which contain polymeric dicarboxylic acids or dicarboxylic acid derivatives, but which exhibit enhanced adhesion to other polymers, especially to fluoropolymers.

SUMMARY OF THE INVENTION

In particular, the present invention is directed to a composition for improving adhesion between an elastomer and a fluoropolymer comprising
  (A) a first polymer comprising an uncured unsaturated polymeric adduct formed by reacting i) a polymer having unsaturation in the backbone of the polymer chain with ii) an unsaturated dicarboxylic acid or dicarboxylic acid anhydride, wherein the acid or anhydride moieties comprise at least three weight percent of said adduct; and
  (B) a compound selected from the group consisting of polyamino primary amines, polyamino primary amine carbamates, and condensation products of polyamino primary amines with aldehydes;
    wherein the number of equivalents of component (B) is equal to or greater than the number of equivalents of carboxylic acid moieties or anhydride moieties present in component (A).

The invention is further directed to a composition for improving adhesion between an elastomer and a fluoropolymer comprising
  (A) a first polymer comprising an uncured unsaturated polymeric adduct, formed by reacting i) a polymer having unsaturation in the backbone of the polymer chain with ii) an unsaturated dicarboxylic acid or dicarboxylic acid anhydride, wherein the acid or anhydride moieties comprise at least three weight percent of said adduct; and
  (B) a polyhydroxy compound; and
  (C) a quaternary phosphonium salt vulcanization accelerator or a quaternary ammonium salt vulcanization accelerator;
    wherein the number of equivalents of component (B) is equal to or greater than the number of equivalents of carboxylic acid moieties or anhydride moieties present in component (A).

The invention is also directed to a curable elastomer composition which comprises
  (A) a first polymer comprising an uncured unsaturated polymeric adduct, formed by reacting i) a polymer having unsaturation in the backbone of the polymer chain with ii) an unsaturated dicarboxylic acid or dicarboxylic acid anhydride, wherein the acid or anhydride moieties comprise at least three weight percent of said adduct;
  (B) an elastomer, different from said first polymer;
  (C) a compound selected from the group consisting of polyamino primary amines, polyamino primary amine carbamates, and condensation products of polyamino primary amines with aldehydes; and
  (D) a curing agent for the elastomer of (B);
    wherein the number of equivalents of component (C) is equal to or greater than the number of equivalents of carboxylic acid moieties or anhydride moieties present in component (A).

The invention is additionally directed to a curable elastomer composition which comprises
  (A) a first polymer comprising an uncured unsaturated polymeric adduct, formed by reacting i) a polymer having unsaturation in the backbone of the polymer chain with ii) an unsaturated dicarboxylic acid or dicarboxylic acid anhydride, wherein the acid or anhydride moieties comprise at least three weight percent of said adduct;
  (B) an elastomer, different from said first polymer;
  (C) a polyhydroxy compound;
  (D) a quaternary phosphonium salt accelerator or a quaternary ammonium salt vulcanization accelerator; and
  (E) a curing agent for the elastomer of (B)
    wherein the number of equivalents of component (C) is equal to or greater than the number of equivalents of carboxylic acid moieties or anhydride moieties present in component (A).

The invention is further directed to laminates of the curable elastomeric compositions and fluoropolymer compositions, both fluoroplastics and fluoroelastomers.

DETAILED DESCRIPTION OF THE INVENTION

Adhesion promoting compositions of the present invention comprise mixtures of carboxylated polymeric adducts and a) polyamines or polyamine derivatives, or b) polyhydroxy compounds. The carboxylated polymeric adducts which are suitable for use in the present invention are disclosed in U.S. Pat. No. 5,300,569. They are prepared by reacting polymeric resins, such as, for example, polybutadiene homopolymers or copolymers of styrene and butadiene, with a dicarboxylic acid or dicarboxylic acid anhydride, such as maleic anhydride. Preferably, the polymeric resin is an unsaturated polymer comprising at least one monomer which is a conjugated diene of 4–12 carbon atoms. The polymer may additionally comprise a monomer which is a vinyl substituted aromatic compound of 8–20 carbon atoms. Polybutadienes are preferred polymers and a preferred polybutadiene is a random 1,2 or 1,4 polybutadiene homopolymer containing 20–90% 1,2 vinyl groups. Polymer molecular weights are generally in the range of 4,000 to 30,000.

The dicarboxylic acid or dicarboxylic acid anhydride which is reacted with the polymeric resin to produce the carboxylated polymeric adducts used in the compositions of the present invention may be any alpha, beta-ethylenically unsaturated dicarboxylic acid or anhydride. Preferably, the adduct is prepared by reaction of maleic acid or maleic anhydride with the polymeric resin. Generally, the unsaturated acid or anhydride comprises at least 3 weight percent of the carboxylated polymer resin adduct, preferably between 3 and 17 weight percent of the polymer resin adduct.

The polyamine compounds and polyamine derivatives suitable for use in the adhesion promoting compositions include primary amines having more than one amino moiety, carbamates having more than one nitrogen-containing moiety derived from polyamino primary amines, and adducts of polyamino primary amines with aldehydes. Examples of suitable polyamino primary amines include ethylenediamine, tetraethylenetetramine, hexamethylenediamine, triethylenetetramine, cumenediamine, tetramethylenediamine, hexamethylenetetramine, 1,2-diaminopropane, diethylaminopropylamine, and 4,4'-methylenebis-(cyclohexylamine). Examples of particularly useful carbamates are hexamethylenediamine carbamate and 4,4'-methylenebis-(cyclohexylamine) carbamate. A preferred polyamino primary amine/aldehyde adduct is N,N'-dicinnamylidene-1,6-hexanediamine.

Polyhydroxy compounds may be used in place of the polyamino primary amines or amine derivatives in the compositions of the present invention. Suitable polyhydroxy compounds include bisphenol A, bisphenol AF, bisphenol S, hydroquinone, 4,4'-dihydroxybenzophenone, is catechol, 2,5-dimethyl-hydroquinone, pentaerythritol, 2,2-dimethyl-1,3-propanediol, and trimethylolpropane. Bisphenols are preferred, and, of these, bisphenol AF is most preferred. When a polyhydroxy compound is utilized, an accelerator, such as a tetralkylphosphonium salt or a tetraalkylammonium salt, will be present to achieve optimum adhesion in the cured product. Such accelerators are disclosed in Schmiegel, U.S. Pat. No. 4,496,682; in Kometani et al., U.S. Pat. No. 3,864,298; and in Patel, U.S. Pat. No. 3,655,727. Preferred accelerators are benzyltriphenylphosphonium chloride, benzyltriphenylphosphonium bromide, benzyltriphenyl-phosphonium phenolate of bisphenol AF, tetrabutylammonium hydrogen sulfate, and tetrabutylammonium bromide.

The amount of polyamino compound, polyamino compound derivative, or polyhydroxy compound which is mixed with the carboxylic acid or anhydride adduct is adjusted so that it is equal to or greater than the amount necessary to completely react with the free carboxylic acid or carboxylic anhydride moieties of the polymeric adduct component of the composition. That is, the number of equivalents of free amino moieties, blocked amino moieties, or free hydroxyl moieties present must be equal to or greater than the number of equivalents of carboxylic acid or carboxylic acid anhydride present in the polymeric adduct. Generally, about 1.25–2.0 equivalents of polyamino compound, polyamino compound derivative, or polyhydroxy compound per equivalent of carboxylic acid or anhydride moiety are sufficient. The adhesion promoter is conveniently prepared by physically mixing the components. When used on a commercial scale, it is most convenient to mill or mix the components of the adhesion promoting composition directly into an elastomer composition without the ingredients of the adhesion promoting composition being subjected to a prior mixing step.

A further embodiment of the present invention comprises curable elastomer compositions which exhibit excellent adhesion to fluoropolymer substrates. A first type of curable composition comprises four principal components: a) an adduct of an unsaturated polymer and dicarboxylic acid or dicarboxylic acid anhydride; b) an elastomer, different from the polymeric component of a); c) a polyamine or polyamino compound derivative; and d) a curing agent for the component b) elastomer. A second type of curable composition comprises five principal components: a) an adduct of an unsaturated polymer and dicarboxylic acid or dicarboxylic acid anhydride; b) an elastomer, different from the polymeric component of a); c) a polyhydroxy compound; d) an accelerator; and e) a curing agent for the elastomer of component b).

The first component of the curable compositions is a member of the class of dicarboxylic acid or dicarboxylic acid anhydride polymeric adducts described above and disclosed in U.S. Pat. No. 5,300,569.

The elastomer which is the second component of the curable composition is an elastomeric polymer which will co-cure with the polymeric adduct. Examples of such elastomers include chlorinated olefin polymers, such as chlorinated polyethylene; acrylonitrile butadiene rubber; polychloroprene homopolymers and copolymers; ethylene propylene copolymer rubber and EPDM copolymer rubbers; chlorosulfonated olefin polymers, such as chlorosulfonated polyethylene and chlorosulfonated ethylene alpha-olefin copolymers; elastomeric copolymers of ethylene and polar comonomers, such as ethylene acrylic elastomers; polysiloxanes, including fluorinated polysiloxanes; fluoroelastomers; epichlorohydrin rubber; polyacrylates; butyl rubber; and halobutyl rubber. Preferred elastomers are elastomeric ethylene copolymers with polar comonomers.

The preferred ethylene copolymer elastomers are elastomeric copolymers of ethylene and at least one other polar monomer. Such monomers include (a) $C_1$–$C_8$ alkyl esters of acrylic or methacrylic acid or (b) vinyl esters of $C_2$–$C_8$ carboxylic acids. The ethylene content of these copolymers is about 20–55 wt. %, preferably 20–45 wt. %. The alkyl (meth)acrylate or the vinyl ester comonomers comprise about 45–80 wt. % of the polymer, preferably about 55–80 wt. %. Alkyl acrylates and alkyl methacrylates suitable for use in the polymers include $C_1$–$C_8$ alkyl esters of acrylic acid or methacrylic acid, for example, the methyl, ethyl, isobutyl, hexyl, and 2-ethylhexyl esters. Methyl, ethyl, and butyl acrylates are preferred. Methyl acrylate is most preferred. Vinyl esters of carboxylic acids suitable for use in the polymers include vinyl esters of carboxylic acids having 2–8 carbon atoms, for example, vinyl acetate, vinyl propionate, vinyl hexanoate, and vinyl 2-ethylhexanoate. Vinyl acetate is preferred. The Mooney viscosity of elastomeric ethylene copolymers which can be used in the present invention is generally 10–120, preferably 10–50 (ASTM D-1646, 100° C., 1 minute preheat, viscosity measured at 4 minutes).

Ethylene copolymers of this type are generally prepared by continuous copolymerization of ethylene and comonomers in a stirred reactor in the presence of at least one free radical initiator at temperatures of from 120° C. to 300° C. and at pressures of from 130 to 310 MPa. Optionally, lo the copolymers are prepared in the presence of about 2–25 wt. % methanol or acetone so that reactor fouling is decreased or eliminated, as disclosed in U.S. Pat. No. 5,028,674.

Representative examples of specific ethylene copolymers include ethylene/methyl acrylate, ethylene/methyl methacrylate, ethylene/ethyl acrylate, ethylene/ethyl methacrylate, ethylene/butyl acrylate, and ethylene/2-ethylhexyl methacrylate. Further representative examples include ethylene/methyl acrylate/carbon monoxide, ethylene/butyl acrylate/carbon monoxide, and ethylene/vinyl acetate/carbon monoxide.

The polyamino compounds, polyamino compound derivatives, or polyhydroxy compounds useful as the third component of the curable compositions of the invention are the polyamino compounds, polyamino compound derivatives, and polyhydroxy compounds described above as components of the adhesion promoting compositions of the present invention. Likewise, it is necessary that these compounds are present in an amount sufficient to react with substantially all the free carboxylic and anhydride moieties present in the dicarboxylic acid or dicarboxylic acid anhydride polymeric adduct. Consequently, the number of equivalents of amino or hydroxy moieties present must be equal to or greater than the number of equivalents of carboxylic acid or carboxylic acid anhydride present in the polymeric adduct. As in the adhesion promoting composition, generally about 1.25–2.0 equivalents of polyamino compound, polyamino compound derivative, or polyhydroxy compound is used per equivalent of dicarboxylic acid or anhydride adduct. When a polyhydroxy compound is utilized, an accelerator which is a tetralkyl phosphonium salt or tetraalkylammonium salt is present in order to achieve optimum adhesive properties.

The elastomer component of the curable composition is the major ingredient of the curable compositions of the present invention. Generally, the dicarboxylic acid or dicarboxylic acid anhydride polymeric adduct will be present in amounts of 2–20 parts by weight per 100 parts of the elastomer, preferably in amounts of 4–10 parts per 100 parts of the is elastomer.

The curable elastomeric blends are crosslinked with a vulcanizing agent suitable for the particular elastomeric component of the composition.

For example, in the case of the preferred ethylene copolymers, a peroxide curing agent is generally used. The curing agent is preferably a composition which generates free radicals at curing temperatures. A dialkyl peroxide which decomposes at a temperature above 50° C. is especially preferred. Among the most useful peroxides are 2,5-dimethyl-2,5-di(tertiary butylperoxy)hexyne and 2,5-dimethyl-2,5-di(tertiarybutyl-peroxy)hexane, dicumyl peroxide, dibenzoyl peroxide, tertiarybutyl perbenzoate, and di[1,3-dimethyl-3-t-butylperoxy)butyl]carbonate. Other curing agents may also be used. For example, a sulfur curative is usually the curative of choice for EPDM copolymers. The appropriate amount of curative employed with a particular elastomer will be that conventionally used in the art. In the case of peroxide curatives, this is usually about 2–7 parts per 100 parts rubber. In general, the dicarboxylic acid or dicarboxylic acid anhydride adduct; non-fluorinated elastomer; polyamino compound, polyamino compound derivative, or polyhydroxy compound/accelerator; and curing agent will be blended on a rubber mill or in an internal mixer, for example, a Banbury mixer, at a temperature below that necessary to initiate cure. In addition to curing agent, various other additives which are conventional elastomer compounding ingredients may be added to the curable composition. These include metal oxides and hydroxides; fillers, such as carbon black, clay, silica, non-fibrillating fluoropolymers, and talc; pigments; antioxidants; antiozonants; plasticizers; accelerators; curative coagents; stabilizers; and waxes. Usually, amounts of from 5–75 parts of a given additive per hundred parts of the elastomeric polymer is used. The is specific amounts will depend on the particular application and physical properties which are to be optimized.

A further embodiment of the present invention comprises a laminate of the curable composition of the present invention with a fluoropolymer, preferably a fluoroplastic which has been treated to promote adhesion. This is of particular utility in applications wherein a laminate having low fuel permeability under high temperature conditions is desired. For example, in U.S. Pat. No. 5,427,831 fuel resistant laminates are disclosed having an elastomeric layer, a non-elastomeric fluoropolymer layer which has been treated to promote adhesion, and an elastomeric covering layer. It is often difficult to adhere the covering layer to the treated fluoropolymer layer, despite adhesion promoting treatment of the fluoropolymer surface, i.e. generally plasma treatment, corona discharge treatment, or sodium etching. It has been found that the curable compositions of the present invention, when laminated to the treated fluoropolymer, exhibit enhanced adhesion, particularly when elastomeric ethylene copolymers with polar comonomers are utilized as the elastomer component. The non-elastomeric fluoropolymer layer is preferably composed of non-elastomeric tetrafluoroethylene polymers, including polytetrafluoroethylene, copolymers of tetrafluoroethylene and hexafluoropropylene, copolymers of tetrafluoroethylene and perfluoro(alkyl vinyl) ether and copolymers of tetrafluoroethylene and ethylene. Copolymers of ethylene and chlorotrifluoroethylene may also be employed. Polyvinylidene fluoride or copolymers of vinylidene fluoride with at least one monomer selected from the group consisting of hexafluoropropylene and tetrafluoroethylene are less preferred, but may be utilized. Lamination of the elastomeric and fluoropolymer layers and cure of the elastomeric layers generally takes place in a single operation, for example, by heating the laminate, optionally under pressure, at temperatures of from 140° C.–200° C.

Although lamination to treated fluoroplastics is a preferred embodiment of the present invention, lamination of the curable elastomer composition to fluoroelastomer compositions, including perfluoroelastomer compositions, is also contemplated.

The adhesion promoting compositions of the present invention are particularly useful in promoting adhesion between non-polar elastomers and fluoropolymers, especially in applications wherein laminates are required which are exposed to high temperatures. In particular, they are useful components in compositions employed in fuel hose laminates and wire covering.

In one particularly preferred embodiment, a laminar structure is formed having at least three layers. The first layer, having a thickness of 0.1 to 4 mm comprises i) an unsaturated polymeric adduct formed by reacting a polymer having unsaturation in the backbone of the polymer chain with an unsaturated dicarboxylic acid or dicarboxylic acid anhydride, wherein the acid or anhydride moieties comprise at least three weight percent of said adduct; (ii) an elastomer, different from the unsaturated polymer of (i); (iii) a compound selected from the group consisting of polyamino primary amines and derivatives of the polyaminoprimary amines; and (iv) a curing agent for the elastomer of (ii). The number of equivalents of component (iii) is equal to or greater than the number of equivalents of carboxylic acid moieties or anhydride moieties present in component (i). The second layer, which is in contact with the first layer, has a thickness of 0.01 to 0.1 mm and comprises a non-elastomeric fluoropolymer which has been treated to promote adhesion by corona discharge, sodium etching, or plasma treatment. The third layer, in contact with the second layer, has a thickness of 0.1 to 1.5 mm and comprises an elastomer, which may be either the same as the elastomer of the first layer or a second elastomer. Preferably, the third layer is a fluoroelastomer.

The elastomer of the first and third layers may be selected from a large variety of elastomer types, including acrylonitrile butadiene rubbers, copolymers of epichlorohydrin and ethylene oxide, hydrogenated acrylonitirile butadiene rubbers, and fluoroelastomers. The structure may further comprise a reinforcing braiding, preferably of a polyester or a polyaramid. The structure may be in the form of a hose or a tube.

In another preferred embodiment, the first layer contains a combination of a polyhydroxy compound and a tetraalkylphosphonium salt vulcanization accelerator or a tetraalkylammonium salt vulcanization accelerator in place of the polyamine, for purposes of promoting adhesion between the first and second layers.

The adhesion promoting compositions of the present invention are particularly suited for use in enhancing adhesion of non-fluorinated elastomers to fluoroplastics, and are especially useful in production of laminated fuel hoses. However, they would also be useful in enhancing adhesion of non-fluorinated elastomer to treated fluoroplastics in the manufacture of food conveyer belting, pumps, and diaphragms.

The following examples illustrate preferred embodiments of the present invention wherein all parts are by weight unless otherwise indicated.

EXAMPLES

Method for Preparation of Test Specimens

Laminated structures, otherwise referred to as adhesive test pads, were prepared for testing by assembling the following layers, each being approximately 6 inches (15.2 cm) square:

Backing layer: cotton duck cloth
Layer 1: uncured elastomer—0.125 inch (3.2 mm) thick
Layer 2: non-elastomeric fluoropolymer—0.002 inch (0.05 mm) thick
Layer 3: uncured elastomer—0.125 inch (3.2 mm) thick
Cover layer: cotton duck cloth Layer 2 was a corona discharge treated film of a copolymer of tetrafluoroethylene and hexafluoropropylene (TEFLON®FEP fluorocarbon film 200C20, available from E. I. du Pont de Nemours and Co.). A strip of MYLAR® polyester film, approximately 2 inches (5 cm) wide, was placed in such a way that it protruded from one edge of the laminate between the fluoropolymer film and one of the elastomer layers. The purpose of this was to aid in separating the layers during adhesion tests conducted after curing. The uncured laminate structure was placed in a 6 inch (15.2 cm) square mold and cured at 162° C. for 45 minutes. The adhesion pad was removed from the mold and cut into strips which were approximately one inch (2.54 cm) wide. The strips were tested for adhesion using ASTM method D413. Peak force and final break force were recorded. Additional pads were tested for adhesion by hand pulling to arrive at a qualitative assessment. In some examples an estimate of hand pull adhesion was is recorded.

Control Example A and Examples 1, 2, and 3

Adhesion test pads were prepared as described in the general method above. The uncured elastomer used in layers 1 and 3 was an ethylene/methyl acrylate copolymer having an ethylene content of 40 wt. % and a Mooney viscosity ($ML_{1+4}$ @ 100° C.) of 22. The composition of the elastomer layer was prepared by compounding the components shown in Table 1 in a Banbury mixer at 100° C. Table I indicates the compositions of the layers for each sample. Adhesion test results are also shown.

Example A

The uncured elastomeric layers of the adhesion test pad contained an unsaturated polymeric adduct but no free diamine nor bisphenol. When cured and subjected to adhesion tests, the pad separated at the rubber-fluoropolymer film interface.

Example 1

The uncured elastomeric layers of the adhesion test pad contained an unsaturated polymeric adduct and bisphenol AF plus an accelerator, i.e. tetrabutylammonium bromide. When cured and subjected to adhesion tests, the pad did not separate at the rubber fluoropolymer film interface, but rather tore in one of the rubber layers (ST, stock tear adhesion).

Example 2

The uncured elastomeric layers of the adhesion test pad contained an unsaturated polymeric adduct and hexamethylenediamine carbamate. When cured and subjected to adhesion tests, the pad did not separate at the rubber fluoropolymer film interface, but rather tore in one of the rubber layers (ST, stock tear adhesion)

Example 3

The uncured elastomeric layers of the adhesion test pad contained an unsaturated polymeric adduct and N,N'-dicinnamylidene-1,6,-hexanediamine. When cured and subjected to adhesion tests, the pad did not separate at the rubber fluoropolymer film interface, but rather tore in one of the rubber layers (ST, stock tear adhesion).

TABLE I

| Component | Control Example A | Example 1 | Example 2 | Example 3 |
|---|---|---|---|---|
| E/MA[1] | 100 | 100 | 100 | 100 |
| Octadecylamine | 0.5 | 0.5 | 0.5 | 0.5 |
| Stearic Acid | 1.5 | 1.5 | 1.5 | 1.5 |
| Process Aid[2] | 0.5 | 0.5 | 0.5 | 0.5 |
| Substituted Diphenylamine[3] | 1 | 1 | 1 | 1 |
| MgO | — | — | — | 5 |
| Ca(OH)$_2$ | 5 | 5 | — | — |
| Carbon Black | 50 | 50 | 60 | 50 |
| CaCO$_3$ | 50 | 50 | 50 | 40 |
| Dioctyl Sebacate | 5 | 5 | 5 | 5 |
| Dicumyl Peroxide | 5 | 5 | 5 | 5 |
| TAC[4] | — | — | 1.25 | 1.25 |

TABLE I-continued

| Component | Control Example A | Example 1 | Example 2 | Example 3 |
|---|---|---|---|---|
| HVA-2[5] | 1.5 | 1.5 | — | — |
| Polybutadiene Adduct[6] | 3 | 3 | 3 | 3 |
| TBABr[7] | — | 3 | — | — |
| Hydroxy Compound[8] | — | 2.3 | — | — |
| Amine[9] | — | — | — | 1.5 |
| Amine Carbamate[10] | — | — | 1.5 | — |

[1]Ethylene/Methyl Acrylate Copolymer
[2]Vanfre ® VAM Process Aid (complex organic alkyl acid phosphate)
[3]4,4-bis(α, α-dimethylbenzyl)diphenylamine
[4]Triallylisocyanurate (72% on clay)
[5]N,N'-m-phenylenedimaleimide
[6]Solid maleic anhydride/polybutadiene adduct (17% maleic anhydride; 70% 1,2-vinyl); Ricobond ® 1756 polybutadiene adduct
[7]20% tetrabutylammonium bromide on vinylidene fluoride/hexafluoropropylene/tetra-fluoroethylene fluoroelastomer support
[8]50% bisphenol AF on a vinylidene fluoride/hexafluoropropylene fluoroelastomer support
[9]N,N'-dicinnamylidene-1,6-hexanediamine
[10]Hexamethylenediamine carbamate

TABLE I

| | Control Example A | Example 1 | Example 2 | Example 3 |
|---|---|---|---|---|
| Adhesion[1] | | | | |
| Hand Pull | low | stock tear | stock tear | stock tear |
| Peak (N/cm) | 17.9 | 101.1 | 92.8 | 108.6 |
| Break (N/cm) | 5.1 | 98.2 | 71.8 | 103.3 |

[1]Adhesion to Teflon ® FEP Fluoropolymer film

Example 4

Adhesion test pads were prepared as described in the general method for preparation of test specimens above. The uncured elastomer used in layers 1 and 3 was a chlorinated polyethylene having a chlorine content of 36% and a Mooney viscosity (ML$_{1+4}$ @ 121° C.) of 80. The compounded composition of the elastomer layer was prepared by mixing the components shown in Table II in a Banbury mixer at 100° C. The uncured elastomeric layers of the adhesion test pad contained an unsaturated polymeric adduct and hexamethylenediamine carbamate as an adhesion promoter. The composition of the chlorinated polyethylene layer and adhesion test results are indicated in Table II. When cured and subjected to adhesion tests, the pad separated at the chlorinated polyethylene rubber-fluoropolymer film interface.

TABLE II

| Component | Example 4 |
|---|---|
| Chlorinated Polyethylene | 100 |
| MgO | 7 |
| PE 200 ® Pentaerythritol | 3 |
| Trioctyltrimellitate | 25 |
| N762 Carbon Black | 75 |
| PB 617A ® low molecular weight polyethylene | 2 |
| Triallylisocyanurate (72% on clay) | 1.5 |
| Irganox ® 1010 Antioxidant | 0.5 |
| Peroxide[1] | 6 |
| Polybutadiene Adduct[2] | 3 |
| Hexamethylenediamine Carbamate | 1.5 |
| Adhesion to Teflon ® FEP fluoropolymer film | |
| Hand Pull (N/cm) | ~14 |
| Peak (N/cm) | 14.0 |
| Break (N/cm) | 8.8 |

[1]40% α, α'-bis(t-butylperoxy)diisopropylbenzene on kaolin clay
[2]Solid maleic anhydride/polybutadiene adduct (17% maleic anhydride; 70% 1,2-vinyl); Ricobond ® 1756 polybutadiene adduct Examples 5 and 6

Adhesion test pads were prepared as described in the general method for preparation of test specimens above. The uncured elastomer used in layers 1 and 3 was a butadiene acrylonitrile copolymer having an acrylonitrile content of 33% wt % and a Mooney viscosity (ML$_{1+4}$ @ 100° C.) of 60 (NIPOL® 1032 rubber, available from Zeon Chemicals). The composition of the elastomer layer was prepared by compounding the components shown in Table III in a Banbury mixer at 1000°C. The uncured elastomeric layers of the adhesion test pad contained an unsaturated polymeric adduct and hexamethylenediamine carbamate. The composition of these layers and the adhesion test results are shown in Table III.

TABLE III

| Component | Example 5 | Example 6 |
|---|---|---|
| Nipol ® 1032 Rubber[1] | 100 | 100 |
| Styrene Butadiene rubber | — | 2 |
| MgO | 10 | 5 |
| CaO | 10 | — |
| N762 Carbon Black | 20 | — |
| N650 Carbon Black | — | 80 |
| N990 Carbon Black | 50 | — |
| Dixie Clay | — | 40 |
| ZnO | — | 5 |
| Stearic Acid | — | 1 |
| Talc | — | 40 |
| Dibutyl Sebacate | 10 | 20 |
| Amine[2] | 2 | 2 |
| 4,4'-dithiodimorpholine | — | 1.5 |
| 2-(4-morpholinylmercapto)benzothiazole | — | 1.5 |
| Tetramethylthiuam disulfide | — | 1.5 |
| Sulfur | — | 0.24 |
| Bis-(3-triethoxysilylpropyl)tetrasulfide | 2 | — |
| Triallylisocyanurate (72% on clay) | 1 | — |
| Dicup ® 40KE[3] | 6 | — |
| Polybutadiene Adduct 1[4] | 4.5 | — |
| Polybutadiene Adduct 2[5] | — | 4.5 |
| Hexamethylenediamine carbamate | 2.25 | 2.25 |
| Adhesion to Teflon ® Fluoropolymer Film | | |
| Hand Pull (N/cm) | ~8.8 | Partial Stock Tear |

[1]Acrylonitrile butadiene rubber, available from Nippon Zeon, Inc.
[2]4,4'-bis(α, α-dimethylbenzyl)diphenylamine
[3]Dicumyl peroxide (40% active ingredient)
[4]Solid, maleic anhydride/polybutadiene adduct (17% maleic anhydride; 70% 1,2-vinyl); Ricobond ® 1756 polybutadiene adduct.
[5]Solid, maleic anhydride/polybutadiene adduct (17% maleic anhydride; <40% 1,2-vinyl); Ricobond ® 1731 polybutadiene adduct.

Example 7

A hose was prepared by extrusion of a 0.025 inch (0.64 mm) thick layer of a fluoroelastomer compound onto a flexible 0.255 inch (6.5 mm) EPDM mandrel. The elastomeric fluoropolymer compound was prepared from a fluoroelastomer precompound containing a copolymer of vinylidene fluoride, hexafluoropropylene, and tetrafluoroethylene containing 0.2 wt % iodine (weight ratio of monomers 36/36/28; Mooney viscosity, $ML_{1+4}$ @ 100° C., of 20) and containing 0.4 phr tetrabutyl ammonium bromide and 2.8 phr of an accelerator and bisphenol AF based curative system. The fluoroelastomer precompound was compounded with the following ingredients in a Banbury mixer in the following weight ratio to form the fluoroelastomer compound: 100 parts fluoroelastomer precompound; 6 parts magnesium oxide; 15 parts carbon black, 20 parts magnesium silicate, 1 part carnauba wax, 4 parts calcium hydroxide, 0.15 parts triallylisocyanurate, and 0.15 parts Luperco® XL peroxide [45% 2,5-dimethyl-2,5(t-butylperoxy)hexane on inert filler].

The fluoroelastomer compound was prepared in a 2.5 inch (63.5 mm) cold feed Davis Standard extruder and was applied to the mandrel using a conventional crosshead extrusion process. After the fluoroelastomer compound was deposited on the mandrel, a tape of non-elastomeric fluoropolymer was wrapped in a spiral fashion over the fluoroelastomer, using nominally 10% overlap. The tape was 0.75 inch (19 mm) wide by 0.002 inch (0.05 mm) thick, and was copolymer of tetrafluoroethylene and hexafluoropropylene, corona discharge treated to improve adhesion. A second extruder applied a layer of 0.050 (1.2 mm) of a compounded ethylene/methyl acrylate copolymer composition. The copolymer component had an ethylene content of 40 wt % and a Mooney viscosity ($ML_{1+4}$ @ 100° C.) of 22. The copolymer compound composition was prepared by compounding the following ingredients in a Banbury mixer at 100° C. in the following ratio: 100 parts ethylene copolymer; 0.5 parts octadecylamine; 1.5 parts stearic acid, 0.5 parts Vanfre® VAM processing aid (a complex organic alkyl acid phosphate); 1 part 4,4'-bis(α,α-dimethylbenzyl)diphenylamine; 5 parts magnesium oxide; 50 parts N762 carbon black; 40 parts calcium carbonate; 15 parts hydrophobic fumed silica; 5 parts dioctyl sebacate; 7 parts dicumyl peroxide; 1.25 parts triallylisocyanurate drimix (72% active ingredient on clay); 3 parts Ricobond® 1756 polybutadiene adduct [solid maleic anhydride/polybutadiene adduct (17% maleic anhydride; 70% 1,2-vinyl)]; and 1.5 parts hexamethylenediamine carbamate.

The laminate was then fed into a yarn braider, and a textile braid of polyaramid was applied over the ethylene/methyl acrylate elastomeric compound. Finally, another layer 0.050 inch (1.2 mm) in thickness of a compounded ethylene/methyl acrylate elastomer, was applied to cover the hose. The copolymer component of the compounded elastomer composition had an ethylene content of 40 wt. % and a Mooney viscosity ($ML_{1+4}$ @ 100° C.) of 22. The copolymer compound composition was prepared by compounding the following ingredients in a Banbury mixer at 100° C. in the following ratio: 100 parts ethylene copolymer; 0.5 parts octadecylamine; 1.5 parts stearic acid; 1 part 4,4'-bis(α,α-dimethylbenzyl)diphenylamine; 70 parts N550 carbon black; 15 parts calcium carbonate; 5 parts dioctyl sebacate; 5.75 Dicup®40C dicumyl peroxide; 0.5 parts N,N'-m-phenylenedimaleimide; 2 parts Ricobond® 1756 polybutadiene adduct [solid maleic anhydride/polybutadiene adduct (17% maleic anhydride; 70% 1,2-vinyl)]; and 10 parts Nipol® 1411 acrylontirile butadiene rubber.

The hose was then steam vulcanized for 30 minutes at 80 psig (0.55 MPa) at 162° C. to crosslink the elastomers in the laminate. The hose was removed from the autoclave and the EPDM mandrel was removed. Adhesion of the copolymer of tetrafluoroethylene and hexafluoropropylene to both the fluoroelastomer compound and the ethylene/methyl acrylate compound layers was good.

Examples 8 and Control Examples B, C, and D

Adhesion test pads were prepared as described in the general method for preparation of test specimens above. The uncured elastomer used in layers 1 and 3 was a mixture of two chlorinated polyethylene types, Tyrin®0136 chlorinated polyethylene and Tyrin®3611P chlorinated polyethylene. The composition of the elastomer layer was prepared by compounding the components shown in Table IV in a Banbury mixer at 100° C. The uncured chlorinated polyethylene elastomer layers of the adhesion test pads prepared for the Example 8 compositions contained an adhesion promoter containing both a polyhydroxy compound and an ammonium salt vulcanization accelerator. The chlorinated polyethylene layer of Control Example B contained neither the polyhydroxy compound nor the accelerator. The chlorinated polyethylene layer of Control Example C contained the accelerator, but no polyhydroxy compound and the chlorinated polyethylene layer of Control Example E contained polyhydroxy compound, but no accelerator. Adhesion test pads were also prepared in which the fluoroplastic intermediate layer and second chlorinated polyethylene layer were replaced by a layer of fluoroelastomer. The test specimens which were prepared substantially as described in the general method for preparation of test specimens above with the following modifications. The laminates were composed of a backing layer, compounded chlorinated polyethylene layer, compounded fluoroelastomer layer, and a cover layer. Thus, the laminate had two polymer layers instead of three. The compounded fluoroelastomer layer was composed of the following components, in the weight ratios stated: 97.2 parts of an iodinated fluoroelastomer (vinylidene fluoride/hexafluoropropylene/tetrafluoroethylene 45/30/25; 0.2 wt. % iodine); 0.6 parts accelerator (20% tetrabutylammonium bromide on a vinylidene fluoride/hexafluoropropylene/tetrafluoroethylene fluoroelastomer support); 2.2 parts of a mixture of the benzyltriphenylphosphonium salt of bisphenol AF and bisphenol AF); 9 parts MgO; 4 parts $Ca(OH)_2$; 12 parts of Ensaco® 250 conductive carbon black; 6 parts of Suprmix Plast Hall DBS (dibutyl sebacate on an inert support); 1.5 parts carnauba wax; 0.35 triallylisocyanurate (72% on an inert support): and 0.35 Luperco® 101XL peroxide [2,5-dimethyl-2,5-(di-t-butylperoxy)hexane]. The components were mixed in a Banbury mixer at a temperature of approximately 105° C. and the compound was milled to produce a sheet which was formed into a laminate layer as described in the general method for preparation of test specimens. The control samples exhibit adequate adhesion to corona treated fluoroplastic polymer, but the adhesion to fluoroelastomer is poor in comparison to the adhesion exhibited by the Example 8 composition. The ingredients compounded into the composition of the elastomeric layers and the adhesion test results are shown in Table IV.

TABLE IV

| Component | Example 8 | Control B | Control C | Control D |
|---|---|---|---|---|
| CPE 1[1] | 80 | 80 | 80 | 80 |
| CPE 2[2] | 20 | 20 | 20 | 20 |
| MgO | 10 | 10 | 10 | 10 |
| $Ca(OH)_2$ | 10 | 10 | 10 | 10 |
| N990 Carbon Black | 25 | 25 | 25 | 25 |
| Dixie Clay | 60 | 60 | 60 | 60 |
| Hisil 233[3] | 5 | 5 | 5 | 5 |
| Kenflex A1 Plasticizer[4] | 5 | 5 | 5 | 5 |
| Dioctyl Sebacate | 20 | 20 | 20 | 20 |
| Triallylisocyanurate | 3 | 3 | 3 | 3 |

TABLE IV-continued

| Component | Example 8 | Control B | Control C | Control D |
|---|---|---|---|---|
| (72% active ingredient) | | | | |
| Peroxide[5] | 7 | 7 | 7 | 7 |
| Butadiene Adduct[6] | 3 | 3 | 3 | 3 |
| Accelerator[7] | 1 | — | 1 | — |
| Pentaerythritol[8] | 5 | — | — | 5 |
| Adhesion to Teflon ® Fluoropolymer Film | | | | |
| Peak (N/cm) | 28.0 | 20.1 | 39.9 | 31.3 |
| Break (N/cm) | 27.3 | 7.0 | 18.9 | 25.9 |
| Adhesion to Fluoroelastomer | | | | |
| Peak (N/cm) | 30.8 | 8.8 | 22.2 | 18.0 |
| Break (N/cm) | 30.3 | 5.4 | 6.8 | 8.8 |

[1]Tyrin ® 0136 chlorinated polyethylene, available from DuPont Dow Elastomers, L.L.C.
[2]Tyrin ® 3611P chlorinated polyethylene, available from Dupont Dow Elastomers, L.L.C.
[3]Precipitated silica, available from PPG Industries, Inc.
[4]Available from Kenrich, Inc.
[5]α, α'-bis(t-butylperoxy)diisopropylbenzene (40% on clay)
[6]Solid, maleic anhydride/polybutadiene adduct (17% maleic anhydride; 70% 1,2-vinyl); Ricobond ® 1756 polybutadiene adduct
[7]Tetrabutylammonium bromide (75% on inert carrier)
[8]PE200 pentaerythritol

Example 9 and Control Examples

Adhesion test pads were prepared as described in the general method above. The uncured elastomer used in layers 1 and 3 was an ethylene/methyl acrylate/butenedioic acid ester terpolymer, Vamac®D ethylene acrylic elastomer, available from DuPont Dow Elastomers, L.L.C. The composition of the elastomer layers was prepared by compounding the components shown in Table V in a Banbury mixer at 100° C. Adhesion test results are also shown in Table V.

TABLE V

| Component | Example 9 | Control Example E | Control Example F |
|---|---|---|---|
| Elastomer[1] | 100 | 100 | 100 |
| Octadecylamine | 0.5 | 0.5 | 0.5 |
| Stearic Acid | 1.5 | 1.5 | 1.5 |
| Process Aid[2] | 0.5 | 0.5 | 0.5 |
| Substituted Diphenylamine[3] | 1 | 1 | 1 |
| Ca(OH)$_2$ | 5 | 5 | 5 |
| N762 Carbon Black | 50 | 50 | 50 |
| Calcium Carbonate | 50 | 50 | 50 |
| Fumed Silica | 15 | 15 | 15 |
| Dioctyl sebacate | 5 | 5 | 5 |
| Dicumyl Peroxide (40% active ingredient) | 5 | 5 | 5 |
| HVA-2[4] | 1.5 | 1.5 | 1.5 |
| Polybutadiene Adduct[5] | 3 | 3 | 3 |
| Accelerator[6] | 3 | — | — |
| Polyhydroxy Compound[7] | 2.3 | — | 2.3 |
| Adhesion to Teflon ®FEP | | | |
| Hand Pull | Stock Tear | Low | Spotty |
| Peak (N/cm) | 101.0 | 17.9 | 12.8 |
| Break (N/cm) | 98.2 | 5.1 | 10.7 |

[1]Vamac ®D ethylene acrylic elastomer, available from DuPont Dow Elastomers, L.L.C.
[2]Vanfre ®VAM process aid (complex organic alkyl acid phosphate)
[3]4,4'-α, α-dimethylbenzyl)diphenylamine
[4]N,N'-m-phenylenedimaleimide
[5]Solid maleic anhydride/polybutadiene adduct (17% maleic anhydride; 70% 1,2-vinyl); Ricobond ®1756 polybutadiene adduct
[6]Tetrabutylammonium bromide (20% in fluoroelastomer)
[7]Bisphenol AF in fluoroelastomer (50% in fluoroelastomer)

What is claimed is:

1. A composition for improving adhesion between an elastomer and a fluoropolymer comprising
    (A) a first polymer comprising an uncured unsaturated polymeric adduct, formed by reacting i) a polymer having unsaturation in the backbone of the polymer chain with ii) an unsaturated dicarboxylic acid or dicarboxylic acid anhydride, wherein the acid or anhydride moieties comprise at least three weight percent of said adduct;
    (B) a polyhydroxy compound; and
    (C) a vulcanization accelerator selected from the group consisting of quaternary phosphonium salts and quaternary ammonium salts;
wherein the number of equivalents of free hydroxyl moieties present in the polyhydroxy compound of (B) is equal to or greater than the number of equivalents of carboxylic acid moieties or anhydride moieties present in the first polymer of (A).

2. A composition of claim 1 wherein the polyhydroxy compound is a phenol.

3. A composition of claim 2 wherein the phenol is a bisphenol.

4. A composition of claim 3 wherein the bisphenol is bisphenol AF.

5. A composition of claim 1 wherein the polyhydroxy compound is pentaerythritol.

6. A composition of claim 1 wherein the phosphonium salt vulcanization accelerator is benzyltriphenylphosphonium chloride.

7. A composition of claim 1 wherein the ammonium salt vulcanization accelerator is tetrabutylammonium bromide.

8. A curable elastomer composition which comprises
    (A) a first polymer comprising an uncured unsaturated polymeric adduct, formed by reacting i) a polymer having unsaturation in the backbone of the polymer chain with ii) an unsaturated dicarboxylic acid or dicarboxylic acid anhydride, wherein the acid or anhydride moieties comprise at least three weight percent of said adduct;
    (B) an elastomer, different from said first polymer;
    (C) a polyhydroxy compound;
    (D) a vulcanization accelerator selected from the group consisting of quaternary phosphonium salts and quaternary ammonium salts; and
    (E) a curing agent for the elastomer of (B);
wherein the number of equivalents of free hydroxyl moieties present in the polyhydroxy compound of (C) is equal to or greater than the number of equivalents of carboxylic acid moieties or anhydride moieties present in the first polymer of (A).

9. A composition of claim 8 wherein the polyhydroxy compound of component (C) is a bisphenol.

10. A composition of claim 9 wherein the bisphenol is bisphenol AF.

11. A composition of claim 8 wherein the polyhydroxy compound of component (C) is pentacrythritol.

12. A composition of claim 8 wherein the elastomer of component (B) is a copolymer of ethylene and a polar comonomer.

13. A composition of claim 12 wherein the copolymer of ethylene and a polar comonomer is an ethylene/methyl acrylate copolymer.

14. A composition of claim 8 wherein the elastomer of component (B) is a butadiene-acrylonitrile copolymer.

15. A composition of claim 8 wherein component (A) is an adduct of maleic anhydride and polybutadiene.

16. A composition of claim 8 wherein the curing agent of component (E) is a peroxide.

17. A composition of claim 8 wherein the polyhydroxy compound of component (C) is a phenol.

18. A laminar structure comprising

A) a first layer comprising
   (i) a first polymer comprising an uncured unsaturated polymeric adduct, formed by reacting a polymer having unsaturation in the backbone of the polymer chain with an unsaturated dicarboxylic acid or dicarboxylic acid anhydride, wherein the acid or anhydride moieties comprise at least three weight percent of said adduct;
   (ii) an elastomer, different from said first polymer;
   (iii) a polyhydroxy compound;
   (iv) a vulcanization accelerator selected from the group consisting of quaternary phosphonium salts and quaternary ammonium salts; and
   (v) a curing agent for the elastomer of (ii);
wherein the number of equivalents of free hydroxyl moieties present in the polyhydroxy compound of (iii) is equal to or greater than the number of equivalents of carboxylic acid moieties or anhydride moieties present in the first polymer of (i); and
   (B) a second layer, in contact with the first layer, comprising a fluoropolymer composition.

19. A laminar structure of claim 18 wherein the polyhydroxy compound of (A)(iii) is a bisphenol.

20. A laminar structure of claim 19 wherein the bisphenol is bisphenol AF.

21. A laminar structure of claim 18 wherein the polyhydroxy compound of (A)(iii) is pentaerythritol.

22. A laminar structure of claim 18 wherein the elastomer of (A)(ii) is a copolymer of ethylene and a polar comonomer.

23. A laminar structure of claim 22 wherein the copolymer of ethylene and a polar comonomer is an ethylene/methyl acrylate copolymer.

24. A laminar structure of claim 18 wherein (A)(i) is an adduct of maleic anhydride and polybutadiene.

25. A laminar structure of claim 18 wherein the (A)(v) curing agent is a peroxide.

26. A laminar structure comprising
   (A) a first layer, having a thickness of 0.1 to 4.0 mm comprising
      (i) a first polymer comprising an uncured unsaturated polymeric adduct, formed by reacting a polymer having unsaturation in the backbone of the polymer chain with an unsaturated dicarboxylic acid or dicarboxylic acid anhydride, wherein the acid or anhydride moieties comprise at least three weight percent of said adduct;
      (ii) a first elastomer, different from said first polymer;
      (iii) a polyhydroxy compound;
      (iv) a vulcanization accelerator selected from the group consisting of quaternary phosphonium salts and quaternary ammonium salts; and
      (v) a curing agent for the elastomer of (A)(ii);
   wherein the number of equivalents of free hydroxyl moieties present in the polyhydroxy compound of (A)(iii) is equal to or greater than the number of equivalents of carboxylic acid moieties or anhydride moieties present in (A)(i);
   (B) a second layer, having a thickness of 0.01 to 0.1 mm, in contact with the first layer, comprising a non-elastomeric fluoropolymer which has been treated to promote adhesion; and
   (C) a third layer, having a thickness of 0.1 to 1.5 mn, in contact with the second layer, comprising an elastomer, different from the elastomer of (A)(ii).

27. The laminar structure of claim 26 wherein the elastomer of the third layer is selected from the group consisting of acrylonitrile-butadiene rubbers, copolymers of epichlorohydrin and ethylene oxide, hydrogenated acrylonitrile-butadiene rubbers, and fluoroelastomers.

28. The laminar structure of claim 26 wherein the structure further comprises a reinforcing braiding.

29. The laminar structure of claim 26 which is in the form of a tube or hose.

* * * * *